(12) United States Patent
Tamassia et al.

(10) Patent No.: US 7,974,221 B2
(45) Date of Patent: Jul. 5, 2011

(54) EFFICIENT CONTENT AUTHENTICATION IN PEER-TO-PEER NETWORKS

(75) Inventors: Roberto Tamassia, Providence, RI (US); Nikolaos Triandopoulos, Cambridge, MA (US)

(73) Assignee: Brown Universtiy, Providence, RI (US)

( * ) Notice: Subject to any disclaimer, the term of this patent is extended or adjusted under 35 U.S.C. 154(b) by 0 days.

(21) Appl. No.: 12/223,224

(22) PCT Filed: Jan. 24, 2007

(86) PCT No.: PCT/US2007/001928
§ 371 (c)(1),
(2), (4) Date: Jan. 8, 2010

(87) PCT Pub. No.: WO2007/087363
PCT Pub. Date: Aug. 2, 2007

(65) Prior Publication Data
US 2010/0110935 A1    May 6, 2010

(51) Int. Cl.
*H04L 12/28* (2006.01)
(52) U.S. Cl. ......... 370/256; 370/389; 370/408; 707/770
(58) Field of Classification Search .................. 370/256, 370/389, 408; 707/3, 104.1
See application file for complete search history.

(56) References Cited

U.S. PATENT DOCUMENTS

| | | | |
|---|---|---|---|
| 6,735,313 B1 * | 5/2004 | Bleichenbacher et al. | ... 380/241 |
| 2004/0107346 A1 | 6/2004 | Goodrich et al. | ............. 713/176 |
| 2004/0243571 A1 * | 12/2004 | Judd | ................................. 707/3 |
| 2005/0007964 A1 | 1/2005 | Falco et al. | .................... 370/256 |
| 2005/0114666 A1 | 5/2005 | Sudia | ............................. 713/175 |
| 2005/0246533 A1 | 11/2005 | Gentry | .......................... 713/170 |
| 2006/0004858 A1 * | 1/2006 | Tran et al. | .................. 707/104.1 |
| 2010/0215051 A1 * | 8/2010 | Solis et al. | ..................... 370/408 |

* cited by examiner

*Primary Examiner* — Dang T Ton
*Assistant Examiner* — Mohamed Kamara
(74) *Attorney, Agent, or Firm* — Harrington & Smith

(57) ABSTRACT

In one exemplary embodiment, a method includes: providing an abstract tree structure having a root node, tree nodes, and leaf nodes, each leaf node corresponds to a portion of data; mapping first network nodes of a distributed network to the tree nodes; mapping second network nodes to the leaf nodes; assigning unique identifiers to the root node, tree nodes, and leaf nodes; storing, at each first network node, the unique identifier of the corresponding tree node, the unique identifier of a parent, and the unique identifiers of children; storing, at each second network node, the portion of data and path information; providing a distributed hash tree wherein the DHT includes a hash value for each node of the ATS signing the top hash value for the root node; and storing, at each second network node, the corresponding hash value of the tree node and the hash values of children.

20 Claims, 3 Drawing Sheets

EFFICIENT CONTENT AUTHENTICATION IN PEER-TO-PEER NETWORKS

TECHNICAL FIELD

The exemplary embodiments of this invention relate generally to peer-to-peer storage networks and, more specifically, relate to data authentication over peer-to-peer storage networks.

BACKGROUND

Peer-to-peer (p2p) networks provide the basis for the design of fully decentralized distributed systems, where data and computing resources are shared among participating peers (see, e.g., [13, 16, 56, 59, 61, 67]). Properties of such systems include scalability, self-stabilization, data availability, load balancing, and efficient searching. As p2p networks become more mature and established, a growing number of new applications emerge for them, with a corresponding need for assuring security in such applications. In particular, verifying the authenticity of stored content is a fundamental problem in p2p architectures, since resource sharing is the generally the core of the design goals of such systems.

Herein, data authentication in p2p networks is considered, where data originating from a trusted source is shared and dispersed over remote and untrusted network nodes and queried and retrieved by end-users through the exported network's API. The focus is on the basic put-get functionality over shared, distributively stored data objects that p2p systems support, as may be realized by any distributed data structure built over overlay p2p networks, including the class of distributed hash tables (DHTs). Various efficient implementations of DHTs [16, 56, 59, 61, 67] provide the core framework for designing and implementing more complex distributed applications built over DHTs. As these applications are growing in scale and complexity, the desire for security increases. It is desirable to guard users of p2p systems against misbehaving or malicious network nodes that falsify their actions after a put operation and their responses to a get operation. That is, it is desirable to achieve high information assurance by designing efficient cryptographic techniques that ensure data integrity and authentic data retrievals in DHTs.

However, most of the existing authentication techniques for contents in p2p networks are static, centralized and often insecure. For instance, existing DHTs that support data authentication use signatures and cryptographic hash functions on a per-object basis. This cannot guarantee full protection against malicious network nodes, since replay attacks can be easily launched where old, invalid data objects are incorrectly verifiable. In particular, there is currently no distributed implementation of the widely-used Merkle tree authentication scheme [48].

SUMMARY

In an exemplary aspect of the invention, a method includes: providing an abstract tree structure having a root node, a plurality of tree nodes, and a plurality of leaf nodes, wherein each leaf node corresponds to at least a portion of data (box 601); mapping, in accordance with a first mapping function, a plurality of first network nodes of a distributed network to the plurality of tree nodes of the abstract tree structure (box 602); mapping, in accordance with a second mapping function, a plurality of second network nodes of the distributed network to the plurality of leaf nodes of the abstract tree structure (box 603); assigning a unique identifier to the root node, each tree node, and each leaf node (box 604); storing, at each first network node, the unique identifier of the corresponding tree node, the unique identifier of a parent of that tree node, and the unique identifiers of children of that tree node (box 605); storing, at each second network node, the corresponding at least a portion of data and path information having a path of nodes from the corresponding leaf node to the root node (box 606); providing a distributed hash tree corresponding to the abstract tree structure, wherein the distributed hash tree includes a corresponding hash value for each node of the abstract tree structure, wherein the Corresponding hash value for the root node is a top hash value (box 607); signing the top hash value of the distributed hash tree (box 608); and storing, at each second network node, the corresponding hash value of the corresponding tree node and the corresponding hash values of children of that tree node (box 609).

In another exemplary aspect of the invention, a distributed network includes: a plurality of first network nodes mapped, in accordance with a first mapping function, to a plurality of tree nodes of an abstract tree structure, wherein each leaf node corresponds to at least a portion of data; a plurality of second network nodes mapped, in accordance with a second mapping function, to a plurality of leaf nodes of the abstract tree structure; and a trusted network node corresponding to a root node of the abstract tree structure, wherein the root node, each tree node, and each leaf node of the abstract tree structure comprises a unique identifier, wherein each first network node stores the unique identifier of the corresponding tree node, the unique identifier of a parent of that tree node, and the unique identifiers of children of that tree node, wherein each second network node stores the corresponding at least a portion of data and path information comprising a path of nodes from the corresponding leaf node to the root node, wherein, in accordance with a distributed hash tree corresponding to the abstract tree structure, each node of the abstract tree structure comprises a corresponding hash value, wherein the corresponding hash value for the root node comprises a top hash value, wherein the top hash value is signed by a trusted entity to obtain a signed top hash value, wherein the signed top hash value is stored by a node of the distributed network, wherein each second network node stores the corresponding hash value of the corresponding tree node and the corresponding hash values of children of that tree node.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Figure 1:
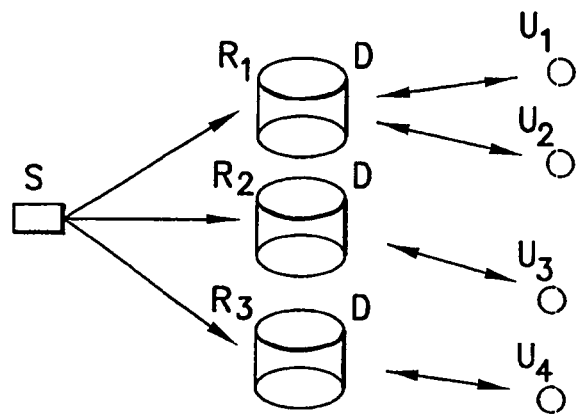
FIG. 1 shows an authenticated data structure.

A new model is introduced for data authentication in p2p networks, based on DHTs, and an efficient implementation of this model for performing dictionary operations is presented, in essence describing an efficient authenticated distributed hash table supporting operations put, get and remove. The model extends the client-server model of authenticated data structures [25, 28, 46, 51]. The scheme is based on the design of an efficient distributed Merkle tree [48]. The distributed authentication scheme can also be used over different types of networks (e.g., adhoc, sensor and overlay networks) and enjoys properties that make it appropriate for realizing more general distributed trees over p2p systems.

A new model is considered for data authentication over peer-to-peer storage networks; where data is stored, queried and authenticated in a totally distributed fashion. The model captures the security requirements of emerging distributed computing applications. An efficient implementation of a distributed Merkle tree is presented, which realizes a Merkle tree over a peer-to-peer network, thus extending a fundamental cryptographic authentication technique to a peer-to-peer distributed environment. It is shown how the distributed Merkle tree can be used to design an efficient authenticated distributed hash table. The scheme is built on top of a broad class of existing distributed hash table implementations, is efficient, and achieves generality by only using the basic functionality of object location. This scheme is used to implement an efficient distributed authenticated dictionary. In contrast to "sign-all" methods which are decentralized but not replay safe and authenticated data structures which are replay safe but not decentralized, the new model, as discussed herein with respect to the exemplary embodiments of the invention, is both decentralized and replay safe.

The subsequent sections are organized as follows. First the motivation behind this invention is considered in Section 1.1. In Section 1.2, the contributions from the invention are noted. Section 1.3 discusses previous related work. In Section 2, a new model is described for distributed data authentication and the techniques used to implement this model are briefly discusses. In Section 3, the main result is presented —the implementation of a fully dynamic distributed Merkle tree over a p2p network. Its performance is also analyzed. In Section 4, it is shown how the distributed Merkle tree can be used to realize an authenticated distributed hash table, which in turn can support a more general data authentication scheme for membership queries. Section 5 further analyzes the performance of the distributed Merkle tree. Lastly, in Section 6, a conclusion is presented and open problems are discussed.

On a more general level, construction of the distributed hash tree is first described independent of any application to authentication. Subsequently, using the construction and additional algorithmic mechanisms and protocols, the design of an authenticated distributed hash table and a distributed authenticated dictionary are presented.

1.1 Motivation

Authenticating content stored in a p2p system is a concern. That is, for example, suppose that Alice wishes to store in a p2p system a collection of files so that they can be easily and efficiently retrieved by her friends. When queries are issued, it is desirable that the p2p system provide content authentication and integrity guarantees, that is, to prove that the files returned were really put in by Alice and have not been modified. Moreover, in a dynamic setting, where content evolves over time through updates, it is also desirable to ensure that data items retrieved by queries have the most up-to-date versions. That is, if Alice updates some files, we wish the system to prove that a file returned has the most recent version.

Consider a conventional query model where a DHT stores key-value pairs of the type (k, x), where keys are unique identifiers and values are associated with keys. The DHT supports query get(k), which returns the value associated with key k. A straightforward approach to the authentication of queries is to individually sign each item stored in the data structure. Namely, when data source S wishes to add (k, x), it computes the signature σ of the pair (k, x) using its private key and inserts (k, (σ, x)) into the data structure. A query for key k now returns the pair (σ, x), where the signature σ allows one to verify whether x is the valid answer. Unfortunately, this "sign-all" approach introduces significant performance overhead and it allows for replay attacks for old values. Indeed, this approach does not provide a mechanism for invalidating old signatures on pairs that have been removed from the DHT or whose value has been modified. Therefore, the following vulnerability arises: a malicious network node can perform a replay attack, by returning, in response to a get operation, an invalid, still verifiable value, that corresponds to an old (expired or out-of-date) key-value pair. Indeed, most of the existing DHTs, for efficiency reasons, keep only a soft state in the system: old inserted data items are expired after a time interval and, to maintain these items, one has to reinsert them. In general, it is desirable to provide signature refreshing, that is, a mechanism that ensures that only recent signatures are used to validate answers to queries.

Replay attacks can be prevented by introducing timestamps in the signed values and a validity period, called time quantum, so that only recent valid signatures are accepted. Still, even with this extension, the signature refreshing cost for the "sign-all" solution is linear in the number of the current items in the DHT: if m items exist in the system, after each time quantum, the signature refreshing cost is O(m), since all valid pairs need to be resigned. On the other hand, maintaining at all times a global authentication state of the system, that includes only the currently valid data items, is a better approach. Indeed, signature amortization, the technique of signing only one digest (short cryptographic description) of the entire collection of (valid) stored data items, owned by the same source, seems to be the right avenue for achieving efficiency with respect to the overhead of signature refreshing.

The Merkle tree [47, 48] is a widely-used scheme in cryptographic constructions for implementing signature amortization and thus signing and certifying members of a large data set. The idea is to use a tree and a cryptographic collision-resistant hash function to produce a digest of the data set. The data set can then be certified by signing this digest. However, there is currently no distributed implementation of the Merkle tree. Existing p2p storage systems often support an authentication service for the stored data using "sign-all" techniques; signature amortization is sometimes used but only on a per-item basis (e.g., for large files systems), and not among all items. Thus, a replay attack is feasible for malicious network nodes and if signature refreshing is used to solve the problem, this leads to inefficient schemes: the signature refreshing overhead is linear in the number of items currently in the system.

1.2 Contributions

The contributions of this invention can be summarized as follows.

A new model is introduced for distributed data authentication that extends previous models based on the client-server computing paradigm. The model captures the security requirements for data authentication that arise in p2p distributed storage systems.

An efficient scheme is presented for implementing a distributed Merkle tree using the primitive object location functionality exported by a p2p distributed system. The scheme is based on the BB[α] tree, a weight-balanced binary tree, and has certain properties that allow it to be efficiently distributed over a p2p network. Its performance is analyzed and it is compared with other naive implementations of a distributed Merkle tree. The tree is specially designed to support locality for answer verification and facilitate the use of caching— when it is possible; thus achieving extra efficiency and resilience against failed nodes.

An efficient authenticated distributed hash table (ADHT) is presented, which extends existing (nonauthenticated) DHTs in various ways. In particular, authenticated and efficient versions of the get, put operations are provided and also a new operation remove (for removing items in the system), that are more secure against replay attacks. The ADHT is compared with other DHT-based distributed storage systems (using "sign-all" type techniques) with respect to the cost of data authentication.

This scheme is used to implement a distributed authenticated dictionary. In a totally distributed setting over a p2p network with n nodes and using only the basic object-location operation, it is shown that one can efficiently authenticate membership queries in a fully dynamic set of m data elements in O(log n log m) time using O(m log m) storage, with similar complexities for supporting updates.

The construction for realizing a distributed Merkle tree is designed for both bottom-up and top-down access. Thus, one also has a new, fully dynamic and efficient distributed tree that can be used in other—not necessarily security-related—applications. The authentication structures do not depend on the implementation of the distributed location system, which allows them to leverage existing p2p architectures.

1.3 Related Work

The Merkle tree [48] is a widely-used scheme in security applications and cryptographic constructions. The idea is to use a tree and a cryptographic collision-resistant hash function to produce a short cryptographic description of a large data set. Elements of the set are stored at the leaves of the tree and internal nodes store the result of applying a cryptographic hash function to the values of the children nodes. The authentication of an element is performed using a verification path, which consists (of the hash values) of the sibling nodes of the nodes on the path from the leaf associated with the element to the root of the tree. The root value is signed and the collision-resistant property of the hash function is used to propagate authentication from the root to the leaves. This construction is simple and efficient and achieves signature amortization, where only one digital signature is used for signing a large collection of data. Updates in the Merkle tree are handled with complexity proportional to the height of the tree [51]. An extension to the symmetric-key setting is given in [29], where it is shown that verification along a path can be performed in parallel.

An authenticated data structure is a client-server model for data authentication [25, 28, 46, 51] where data is queried not from the trusted data source, but rather from a different, untrusted, entity. The cryptographic technique of signature amortization is used, similarly to the Merkle tree. A significant amount of work has been on developing efficient authenticated data structures, starting from the certificate revocation problem [5, 22, 36] and the design of authenticated dictionaries [1, 26, 27] and continuing with authenticated data structures for more general queries [4, 15, 28, 46]. Work related to authenticated data structures includes [10, 14, 24, 42, 43, 54, 55, 69].

There is a large and growing literature on p2p overlay networks. One popular class of overlay networks is that of distributed hash tables (DHTs), fundamental distributed structures that make use of consistent hashing to efficiently support queries for exact matches with data keys. In particular, distributed hash tables (DHTs) (see e.g., Chord [21, 68], Koorde [34], Pastry [62], Scribe [63], Symphony [44], and Tapestry [72] and [56, 59, 67]) support the basic functionality of put and get operations on key-value pairs. DHTs are based on randomized searching techniques in distributed environments (see also, [35, 45, 53]). For a broad class of DHTs, an object is located with O(log n) expected communication steps, where n is the number of nodes of the DHT. As an example of performance, Chord [67], in its original form, supports queries using O(log n) messages and O(log n) words of memory corresponding to the O(log n) degree of the underlying graph. With advances in distributed object searching and the development of DHTs, several practical distributed storage systems over p2p networks have been designed and implemented. Examples include PAST [16], CAN [59], CFS [13] and OpenHDT [61]. Related distributed data structures for searching ordered data in a p2p network, based on the randomized skip-list data structure [57], are studied in [2, 3, 30]. These structures achieve expected O(log n) query time and expected O(log n) update times, using n hosts, each of size O(log n). In [23], an adaptation of skip graphs is presented that uses O(1) space per network node. Other work on distributed data structures in a different setting, includes [33, 39].

After the development of distributed hash tables, many researchers have designed search trees, aggregation trees and other type of trees over a DHT (see, e.g., [12, 19, 31, 40, 58, 71]). However, these trees cannot be used to implement a distributed Merkle tree. First, most of these trees are static, that is, they do not support dynamic updates on them. Second, these constructions are either search trees or special purpose trees that are actually not appropriate to realize a distributed Merkle tree. In particular, BATON tree [31], although dynamic, is based on AVL trees and cannot be used for the purposes of exemplary embodiments of the invention; e.g., it cannot support efficient locality of verification and caching. Note that a distributed Merkle tree may be very sensitive to node losses or structural changes because of the use of the cryptographic hash function. Unlike other trees, an authentication tree may be sensitive in accuracy and correctness.

Some security issues related to p2p systems are discussed in [66], but the authentication problem is considered solved signing per-item signatures. Numerous DHTs have been shown to tolerate significant network-node failures with respect to routing information, under various failure models (see, e.g., [17, 18, 34, 37, 52, 60, 62, 64, 68, 72]. Work related to security issues and authentication on networks include [6, 7, 8, 9, 11, 38, 41, 49, 50, 65, 70]. Conventional p2p storage systems, e.g., [13, 16, 56, 59, 61], support an elementary authentication service for the stored data that is of the "sign-all" type, where the retrieval of a stored data object is verified to be authentic by the requesting entity using per-items individual signatures (OpenDHT [61] also supports secure updates—put and remove). Often this service adopts the so-called self certified data as introduced in [20]. The idea is that the data owner, before it inserts an object, digitally signs it using his private key (a PKI is assumed). The signature becomes part of the inserted object and when a data item is large and gets partitioned into blocks that are stored as separate objects in the system, then these blocks are cryptographically binded using collision-resistant hashing and some tree-like hierarchy among the blocks. Accordingly, in this case the root-block is digitally signed. Although this authentication technique may resemble a Merkle tree, this mechanism is not as efficient as a Merkle tree. Signature amortization is performed only for a large data item and not for different data items. That is, data items are separately signed. Thus, self-certified data [20] does not provide a solution to replay attacks and the signature refreshing problem. Moreover, the use of the authentication tree is static, meaning that no updates are performed, and also unbalanced, since file systems often have a flat structure and can be unbalanced. With the distributed Merkle tree, a different method is proposed for authenticating objects in distributed storage systems, which supports authentic put, get and remove and has many advantages for data integrity in distributed systems. One may note that since the construction discussed herein makes a black-box use of the underlying object location functionality of a DHT, a DHT can be used that is additionally resilient to adversarial behavior with respect to routing information.

2 Model

In this section, the distributed data authentication architecture is presented. The model is as follows: a data source S maintaining a (possibly structured) set D of elements; a distributed p2p network N that stores set D on behalf of the source and supports queries about D by providing both the answer to a query and a proof of the validity of the answer; and users who issue queries about D by accessing the p2p network N and verify the validity of the answer using the proof.

Data set D may be dynamic, that is, it may evolve in time through update operations submitted by the source to the network N. It is desirable to secure authentication schemes that impose low computational, communication and storage overhead to the participating parties and the underlying network. In particular, the cost parameters of the authentication scheme are: (1) storage cost, the amount of information stored at the source, the network and a user; (2) update cost: the computational and communication costs incurred at the source and the network when updates to data elements occur; (3) query cost: the computational and communication cost incurred by the network to answering queries; and (4) verification cost: the computational cost incurred by a user to verify the validity of an answer to a query.

Informally, one can describe the security requirement that the authentication scheme should satisfy. An authentication scheme may be considered secure if, for a query issued by a user to the network N, a polynomial-time adversary controlling network N having oracle access to the authentication scheme does not have a significant, non-negligible (on some security parameter) advantage in causing a user to accept (verify as correct) an incorrect answer.

The model differs from conventional authenticated data structures as follows (see FIGS. 1 and 2). Data elements and authentication information are distributed over the network nodes, whereas in an authenticated data structure, each responder stores a copy of the entire data set D and all the authentication information. Also, the user and the source do not have access to the structure of the network and interact with it through its interface.

Figure 2:
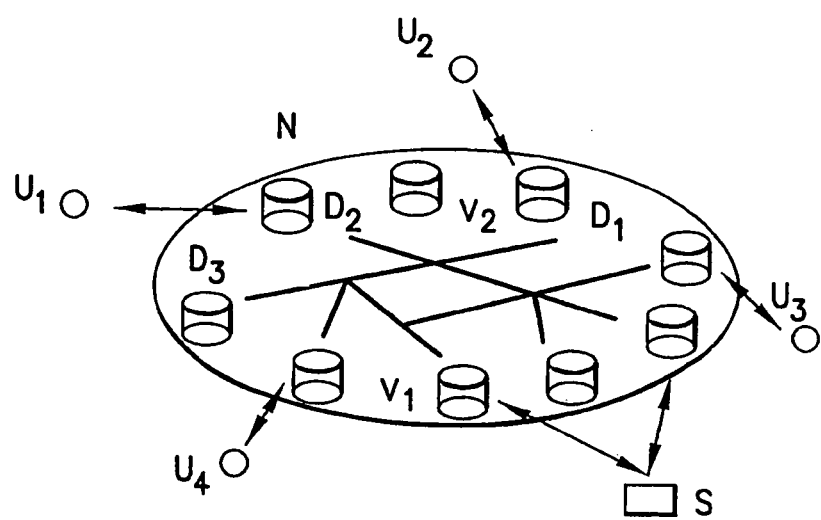
FIG. 2 shows a distributed authentication over a p2p network.

FIG. 1 shows an authenticated data structure. Responders $R_1$, $R_2$ and $R_3$ each store set D on behalf of source S and answer queries by users. In comparison, FIG. 2 shows a distributed authentication over a p2p network N. The data source S and users $U_1$, $U_2$, $U_3$ and $U_4$ may contact any node of the p2p network N. Data and authentication information is distributed in the network N.

A distributed hash table (DHT) is used (see, e.g., [16, 56, 59, 61, 67]) as the underlying distributed p2p network. This choice has two advantages. First, one uses a system widely accept by the computer systems community, which allows the scheme to leverage existing p2p architectures. Second, since DHTs generally have an elegant, minimalistic interface having operations put and get, one can build authentication on top of a simple functionality. In fact, the scheme may be defined with respect to an even simpler primitive operation, locate ( ), which returns the id of a network node corresponding to a given abstract id. Most of the existing DHT implementations have the following properties: (1) a DHT with n network nodes uses O(log n) storage per node and performs a location operation (also, put and get) in O(log n) network hops (node-to-node communication steps) with high probability; (2) node additions, deletions, and failures are handled dynamically through a distributed algorithm that incrementally updates the routing information; (3) some form of redundancy is used, which replicates data objects to a constant number of neighboring nodes so that node failures are tolerated also with respect to the data stored at them; and (4) caching techniques are used to improve data retrieval.

Using the abstract functionality of a DHT, one can extend the model of authenticated data structures to a distributed authentication model that operates over a p2p network. Schemes are designed that work for most DHT implementations and may not depend on the details of the implementation. However, when it is appropriate for the efficiency of the scheme, one may take advantage of specific properties of the underlying functionality that are commonly present in many DHT implementations.

3 Distributed Merkle Tree

What follows is an efficient distributed implementation of a Merkle tree over a peer-to-peer storage system. Numerous security protocols and cryptographic constructions are based on Merkle trees. Thus, implementing a Merkle tree in a distributed manner yields distributed versions of such protocols and constructions. The following three properties are the primary considerations of a distributed Merkle tree (DMT): the tree should be balanced and efficiently maintainable, verification paths (membership proofs) should be located in a distributed way and updates should be implemented in a distributed way. Additionally, the cost parameters of a DMT that preferably should be minimized are: the location cost for a verification path (proof), the update cost to maintain the authentication structure after updates on the data set and the storage cost. Both the location and update costs each have (1) processing cost, i.e., computational cost for the participating nodes in the system, and (2) communication cost, i.e., cost of location operations or direct communications between nodes. It is particularly preferable to facilitate the location (and creation) of the verification paths of the hash tree.

First described are some relatively straightforward but inefficient solutions that still give insight as to what an efficient scheme should achieve. In the discussion, one assumes a basic scenario, where each network node i has an object $x_i$ and one wishes to distribute a balanced hash tree built on top of a data set $\{x_1, \ldots, x_n\}$.

The first approach would be to build a regular hash tree on top of the $x_i$ values and then store the hash values in the tree as new "regular" objects in the system. The first problem to consider is how the hash values are indexed, i.e., with which keys they are stored in the system. The hash value is a value that is unknown to network nodes, thus the value itself cannot be used as a key. A straightforward solution to overcome this problem is to replicate (at least the structure of) the tree to all involved network nodes and then to use unique identifiers (e.g., encodings of a canonical representation of the tree structure) for storing hash values in the DHT. So, if nodes have a view of the current hash tree, then one has a functional DMT. The performance is as follows. The cost to construct a verification path is O(log n) locate operations, that is O($\log^2$ n) time and communication cost. Recall, a location operation takes O(log n) time. However, the cost to maintain the tree, after updates, at each network node is high: an update triggers information of O(log n) size to reach each network node, which requires the existence of a flooding-type broadcast capability over the distributed hash table and cost O(n log n). More importantly, the O($n^2$) total storage of this approach is prohibitive.

Another approach is to have each node store the entire verification path (verifying hash values) of the object it stores. Thus, O(1) verification path cost is achieved, but now the update cost amounts to O(n) locate operations (since each new hash needs to be given to O(n) other nodes) or O(n log n) time and communication complexity. Of course, there are extra difficulties, like how a new hash value is computed and by whom; this involves some specific protocol and some specific additional communication between nodes. Although, one can use ideas similar to techniques for Merkle tree traversal (see, e.g., [32]) to facilitate the update of hash values, still, the cost stays the same. The total storage cost is O(n log n).

As an alternative approach, and a preferable one; one can design an efficient dynamic DMT using route distribution. As follows, the main ideas of the new scheme are presented. The scheme is generally more efficient than the above-explained straightforward solutions. Let T be a balanced binary tree defined on top of elements $x_1, \ldots, x_n$. Each tree node u has a tree id id(u). Tree T is used also as a hashing structure, i.e., as a hash tree. That is, a cryptographic hash function is used to label each tree node u with a hash value L(u) (the value one obtains by applying the hash function to the labels of its children).

Hash values (tree node labels) are stored in the DHT as regular values keyed by the corresponding tree id; i.e., label L(u) of tree node u is stored at the network node U corresponding to tree id id(u). This mapping may be augmented by additionally storing at U the labels of the children of u. Consider element x stored at leaf node w and let $p=(w, u_1, \ldots, u_k, r)$ be the path from w to the root r of T. (One treats identically leaf nodes of the tree and corresponding network nodes.) The node of the network storing element x is storing information related to path p of tree T. The stored information at w may include: (1) the structural information of path p, i.e., left-right relation of nodes in the path p; (2) the balancing information of nodes in path p, i.e., information that is used for restructuring the tree and maintaining its balance; and (3) sufficient information for locating the hash values of p, namely ids id($u_1$), ..., id($u_k$), id(r) (note: the verification path is completely accessible by this information). Note that this information does not include any hash values (tree labels).

This authentication structure allows queried nodes to rapidly report (e.g. immediately report) the O(log n) tree nodes storing the hash values in the path. Then the user contacts O(log n) nodes, by performing O(log n) locate operations. Alternatively, the queried network node collects the proof, not the user. Regardless, the query cost is O($\log^2$ n). It is emphasized that using route distribution, that is, maintaining the invariance that each network node in the system knows the route for its verification path, one can achieve extra efficiency, as will be discuss below. The scheme uses O(n log n) total storage. Thus, it is a space optimal structure, since the O(log n) storage per network node overhead is asymptotically the same with the O(log n) per node storage overhead for the distributed hash table itself (i.e., routing information). With respect to the updates, one notes the following. Regarding hash values, hashes along the path are recomputed and this can be done using O($\log^2$ n) communication cost (O(log n) location operations suffice in updating O(log n) hash values).

Regarding the update of the tree itself, note that using the balancing information a node can update the structure of the tree generally in O(log n) time and accordingly advertise the changes to the involved nodes. However, note that although hash values in p may be changed for every update, not all nodes change balancing or structural information and one may take advantage of this fact. Only nodes that need restructuring should be updated and advertised. Using, e.g., BB[α] trees, which are weight balanced trees enjoying important properties, one can actually have that on average O(1) rotations occur and they occur more often at nodes close to leaves than at nodes higher in the tree. Each such rotation involves communication cost proportional to O(k log k), where k is the size of the subtree rooted at the place where the rotation took place. One thus expects, on average, a very good performance.

3.1 An Efficient Distributed Merkle Tree

Consider the more general case where an authentication structure over m ≦n objects is built over the distributed hash table functionality. Start by first designing a distributed Merkle tree using the primitive locate ( ) operation over a peer-to-peer network. Consider the basic case where m objects (data items) owned by a single source are stored in the network and, without loss of generality, assume that objects are stored at distinct network nodes. Later consider generalizations, where more than one object is stored at nodes and also where more than one source produces these objects.

The scheme is described as follows, where reference is generally made to FIGS. 3 and 4. For convenience, tree nodes are denoted by lower case letters and network nodes by capital ones. Let T be a balanced binary tree build over the m objects $x_1, \ldots, x_m$. Tree T is used as a hashing structure in the standard way: each tree node u in T has a unique id id(u) (drawn from a space of tree node ids) and is associated with (e.g. stores, conceptually) a label L(u), which equals to the cryptographic hash $h(L(v_1)\|L(v_2))$ of the hash values that are associated with (e.g. stored at) its children $v_1$ and $v_2$ and each leaf stores the hash value $h(x_i)$ of the corresponding object $x_i$. However, the hashing structure is augmented in the following manner: internal tree node u with children $v_1$ and $v_2$ also stores the hash values of $v_1$ and $v_2$.

Figure 3:
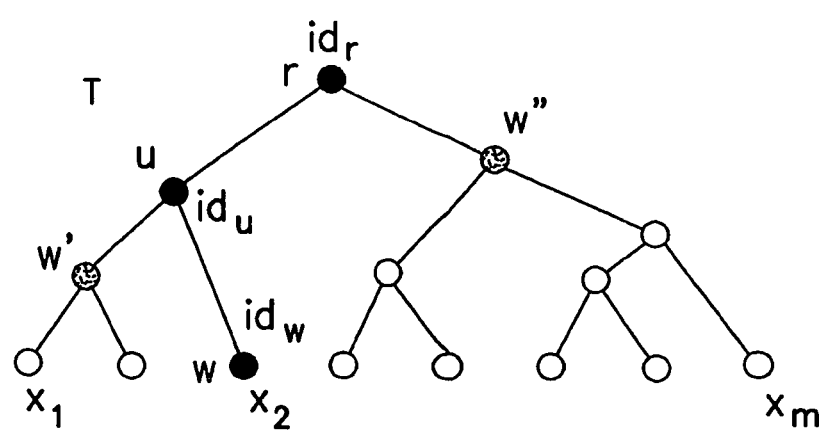
FIG. 3 shows a balanced hash tree T over data items $x_1, \ldots, x_m$.
Figure 4:
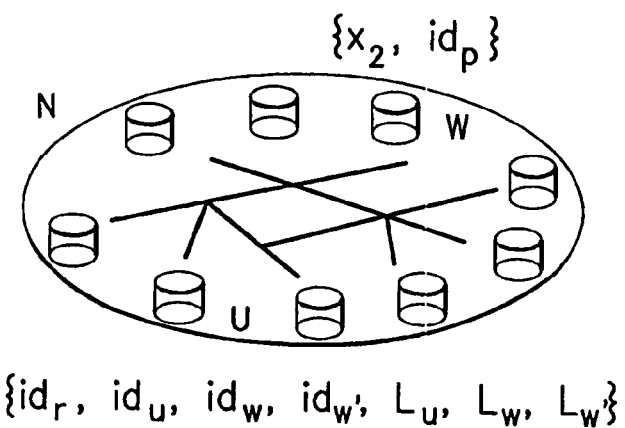
FIG. 4 shows a tree distribution over the network and information storage.

FIG. 3 shows the balanced hash tree T over data items $x_1, \ldots, x_m$. Tree node u is identified by $id_u$ and mapped to network node U. Leaf node w corresponding to data item $x_2$ with verification path p is mapped to network node W. FIG. 4 shows the tree distribution over the network and information storage. Network node U corresponding to tree node u stores $\{id_r, id_u, id_w, id_{w'}, L_u, L_w, L_{w'}\}$ and local structural information about u. Network node W corresponding to w stores $\{x_2, id_p\}$ and structural and balancing information about p. Note that by contacting nodes in id($p_2$) all information about the verification path of $x_2$ can be retrieved.

Each tree node u is mapped to a network node U=ƒ(u) through a function ƒ. Node U stores the (three) hash values associated with node u. Additionally, U stores the tree node ids of the parent tree node and the children of u and local structural information about node u. Moreover, a leaf node $w_i$ corresponding to object $x_i$, is also mapped to a network node $W_i=g(x_i)$ through function g. Note that no restriction is imposed on functions ƒ(•) and g(•). In general, ƒ=g; they are the function that is used by the underlying peer-to-peer network. Two distinct functions are used to denote the possibility that more efficient schemes can be designed by having ƒ and g satisfying some other appropriate relation. Node $W_i$ stores the following information: (1) the object $x_i$ and (2) information related to path $p_i$ in T from node $w_i$ to the root r of T. In particular, (2) may include: the ids of the tree nodes of path p in T, this information being denoted as id(p), and the structural and balancing information of tree nodes in p, that is, for each tree node u in p with children $v_1$ and $v_2$, U stores: (a) whether $v_1$ or $v_2$ belongs in p; and (b) the balancing information of node u, which is basically a pair $(b_1, b_2)$ of balancing information related to subtrees defined by $v_1$ and $v_2$ respectively (for BB[α], information for tree-weights).

Note that the scheme, in fact, distributes internal tree nodes and verification paths over a peer-to-peer network N. The tree is designed mainly for bottom-up use, which is appropriate for most security related and cryptographic applications. It can be easily extended to also support top-down traversal, as a search tree. However, such a use may be in contrast with the flat structure of a peer-to-peer location system. Finally, the tree T may be chosen to be a weight-balanced tree and, in particular, a BB[α] tree. This choice is related to the efficiency of the scheme as described below in Section 5.

For a series of O(m) updates operations on an initially empty hash tree, a distributed Merkle tree T based on a weight-balanced BB[α] tree, with a $$\in \left(\frac{1}{4}, 1 - \frac{\sqrt{2}}{2}\right),$$

has O(log n log m) amortized structural updated cost. In particular, during this series of tree updates, structural updates at level k of T with cost $O(2^k)$ occur with frequency $$o\left(\frac{1}{2^k}\right).$$

Overall, from the analysis of the scheme in Section 5 and the preceding paragraph, the following summarizes the efficiency of the scheme and the main result. Optimal network refers to a network where location operations take O(log n), where n is the network size.

There exists a scheme for implementing a distributed Merkle tree T over a peer-to-peer network N with the following properties. If m is the size of the set over which tree T is built and n is the total number of nodes in the network N, with m≦n, then:

1. The distributed Merkle tree uses space O(m log m), distributed over O(m) network nodes, and incurs O(log m) storage overhead per network node.

2. A verification path has size O(log m) and can be accessed with O(log m) locate operations; thus, for an optimal network N, the expected computational and communication cost for accessing a verification path is O(log n log m).

3. A hash update on the distributed Merkle tree involves O(log in) location operations; thus, for an optimal network N, the expected computational and communication cost of a hash update is O(log n log m).

4. A structural update on the distributed Merkle tree involves O(m log in) location operations, amortized over a series of O(m) structural updates on an initially empty tree; thus, for an optimal network N, the expected amortized computational and communication cost of a structural update is O(log n log m).

3.2 Improvement Through Caching

A simple extension is now discussed that can be used to improve the cost for path retrieval and the cost for updates of the scheme under a reasonable assumption. This improvement is applicable because of the design of the DMT based on route distribution. Assuming that network-node failures occur less often than queries and updates on the DMT, one can improve the efficiency of the scheme by extending it as follows. The goal is to transform the multiplicative O(log n) factor into an additive term in the complexity of the scheme that is introduced by the desire to locate network nodes storing hash values that are to be retrieved or updated. Caching network node ids helps in this direction. The extension is to have each network node corresponding to a leaf of the tree to cache in its memory the O(log m) network nodes that store the hash values corresponding to the path that this node stores. This can be easily achieved, since the node contacts these nodes as it updates its path, so the used node ids are remembered (e.g. only the used node ids need be remembered). In this way, no location operation is needed. Of course, since network nodes can fail or go down, it is possible that cached nodes are no longer nodes of the network. In this case, one has a cache miss which will trigger a location operation. Although one can still use some techniques to avoid this overhead, one can see that when the rate of network node failures is sufficiently small then one can actually amortize the O(log n) factor due to occasional location operations in the cost for operating on the tree. Indeed, node failures are typically tolerated by the peer-to-peer system by replicating data (key-value pairs) to neighboring (according to the identity space ordering) network nodes. Thus, one can actually use this feature to possibly eliminate a cache miss, by caching not only the exact network node but also their successor. In particular, if network nodes fail independently with probability $$o\left(\frac{1}{\log m}\right)$$

during the time interval of a tree traversal, then the expected number of network node failures that occur during a path retrieval or update is O(1). Thus, the expected complexity for path retrieval and updates on the tree is O(log n+log m).

Table 1 summarizes the comparison between the various schemes for implementing a distributed Merkle tree. One can see that the scheme provides an efficient solution to the problem of implementing a distributed Merkle tree and, under certain assumptions about the rate of node failures, using caching, one can have an asymptotically optimal scheme in an amortized sense. When m>n, one can appropriately extend the scheme by having each network node maintain an additional data structure (for locating the stored elements). Finally, note that the scheme supports authentication of data collections of one data source; multiple data sources can be supported simply by using multiple instantiations of the scheme.

TABLE 1

|  | Storage | Path Retrieval | Hash Update | Structural Update |
| --- | --- | --- | --- | --- |
| Tree Replication | $O(m^2)$ | O(log n log m) * | O(m log n) * | O(m log n) * |
| Path Replication | O(m log m) | O(1) | O(m log n) * | O(m log n) * |

TABLE 1-continued

|  | Storage | Path Retrieval | Hash Update | Structural Update |
|---|---|---|---|---|
| Route Distribution | O(m log m) | O(log n log m) * | O(log n log m)* | O(log n log m)** |
| Caching | O(m log m) | O(log n) * | O(log n)* | O(log n) ** |

Table 1 is an efficiency comparison of two straightforward schemes that use tree replication and path replication with the BB[α]-based scheme that uses route replication and its extension through caching. The comparison is performed with respect to the storage cost, the cost to retrieve a verification path and the costs to perform a hash and structural update, respectively, where n is the network size, m is the data set size and m≦n. Path retrieval and update costs refer to computational and communication complexity to perform the corresponding operation. Expected complexity is denoted using * and amortized expected complexity using **.

4 Authenticated Distributed Hash Table

It is now shown how to use the DMT described in the previous section to design distributed authentication techniques that can accordingly have various applications. The DMT is first used to authenticate the basic operations of DHTs. That is, an efficient authenticated distributed hash table (ADHT) is designed.

As apparent from Section 2, the model of data authentication considers a data source S that produces m data items and stores them in a DHT. The DHT supports the insertion key-value pairs through operation put and retrieval of a value given its key through operation get. The DMT is used to augment the functionality of a DHT as follows. The system should support: (1) Authenticated put: A key-value pair can be inserted in the distributed hash table by source S in a way that both the system authenticates S's identity and source S is assured about the validity of the insertion; (2) Authenticated get: A user of the system can retrieve the value that corresponds to an existing (stored in the system) given key in an authenticated way; that is the user is given a proof that can be used to verify the authenticity of the data; (3) Authenticated remove: A previously inserted in the system key-value pair can be removed from the DHT by source S in a way that both the system authenticates S's identity and source S is assured about the validity of the removal. Typically, DHTs do not support a removal operation, but rather, when used to support distributed storage, usually a TTL time interval is assigned to every inserted data item, which is used to determine an automatic deletion of the item from the system. With respect to this, the design uses a different approach. As in the model of authenticated data structures, the existence of a PKI is assumed.

An authenticated distributed hash table (ADHT) is implemented using the following standard authentication technique. Signature amortization is performed by the use of a Merkle tree (using a cryptographic collision-resistant hash function) built on top of the data items owned by the source S. The hash of the root of the tree serves as the data digest and is signed by the data source. A data item is verified to be owned by S if the signed root hash value is verified to be authentic (signed by the source) and a verification path binds the item with the signed digest. The security of the technique follows for the security properties of the signature scheme in use and the collision-resistant hash function in use.

The only non-trivial part of the above design is the fact that now the system is a DHT over a peer-to-peer network. The DMT is used to compute the digest of the data owned by S and to realize signature amortization: only one signature over m data items. Now, an additional level of hashing in the tree is added: at a leaf node of the tree the hash stored is the hash of the concatenation of the hash of the key and the hash of the corresponding value. Some of the details of the scheme are briefly described. One may assume that using standard bootstrapping techniques both the data source and the user have access (through direct connection) to a valid (i.e., running) node of the underlying peer-to-peer system. Assuming that the DMT is already used as described above to amortize one signature of data source S over m items and that the source keeps a copy of the signed digest of its data, one has that about functionality of the system:

Updates are performed by the source S first contacting a node of the network and then issuing an update request, where the signed digest is also submitted to the system. The system then performs a path retrieval operation on the DMT and verifies the authenticity of the requester (i.e., that the requester in the valid source of the data associated with the DMT). If the verification rejects, so does the system. Otherwise, the system reports to the source the verification path. The verification paths are augmented to contain all the additional information needed by the source in order to execute (simulate) locally both the hash and the structural update in order to recompute the correct new root hash value of the updated tree. This is feasible because both hash updates and structural tree adjustments (rotations) only happen along a path in a bottom-up fashion. Once the source implements the update and computes the new root hash, it signs it and returns a copy to the contacted network node. Then a regular hash tree update is performed by the system to execute the put or remove operation. Note that by this interaction the source need only keep O(1) authentication information, namely, only the current signed digest. Note that the above technique to make this feasible, i.e., the interaction with the system as querier, is similar to the one used in [24]. Note that asymptotically additional computational or communication cost may not be introduced by this extra interaction between the system and the source.

A user contacts a network node and requests the value of a key. A path retrieval query is executed over the tree by the system and what is returned to the user is: (1) the corresponding value, (2) the verification path (collection of hash values and relative information for computing the root hash) and (3) the signed digest. The user accepts the answer (value) if and only if the signed digest is valid and hashing over the value and the verification path results in a hash value that equals the root hash.

Note that in a way, the source updates the data set by effectively first querying it in a similar way that a user would do.

There exists an authenticated distributed hash table over a peer-to-peer network of n nodes that supports authenticated operations put, get and remove on a data set of size m≦n, such that:

1. The authentication scheme is secure;
2. The storage at the source is O(1); the storage at the network is O(m log m);

3. The query cost is O(log m), that is, O(log m) locate operations; or, equivalently, the expected time and communication complexity to answer a query is O(log n log m);

4. The amortized update cost is O(log in), that is, O(log m) locate operations; or, equivalently, the amortized expected time and communication complexity of a query is O(log n log m).

The security property of ADHT is briefly considered. This follows using standard reductions to the security of the underlying cryptographic primitives that is used in the authentication scheme; under standard hardness assumption. That is, by using a family of collision-resistant hash functions and a signature scheme secure against adaptive chosen-message attacks, one can show the security of ADHT. Note that as described above, the security of the source against adversarial behavior by the DHT (or the underlying network) is still captured, since the interaction between the source and the DHT is treated as a special type of querying.

Existing designs for distributed hash tables use the "sign all" approach for storing data items of the same data source. Although some systems use a signature amortization through hashing, such that a large data item, e.g., a file or an entire file system, is divided into blocks which are binded together through hashing and only the root block is signed, this is performed within the data item itself, not for the entire data collection that a source stores in the system. Thus, the scheme presented is unique by virtue of amortization of one signature over any collection of large data items (even large files or entire file systems). DHTs typically do not support a removal operation (exception is OpenDHT [61]), but instead they introduce a time-to-live (TTL) mechanism, so that old stored data items expire and are automatically deleted. In this TTL-based approach, if the source needs to renew the stored data, it needs to insert it and thus to sign it again. Additionally, even when stored data does not expire the issue of data freshness is critical, related to replay attacks. An old signed value may not be valid anymore with respect to the application that uses it. A signed statement may be copied and forgotten even when it is not valid anymore. Thus, a signed statement should be a freshly signed statement. This can be done by signing a time-stamped data and checking that not only a signature is verified but also it is fresh. In a system storing m data items where O(m) signatures are used, the signing cost for updating them is also O(m). Signing typically involves expensive computations, thus the introduced computational overhead may be high. Instead, in the presented scheme only one statement (the root hash) must be refreshed. The signing cost is O(1), at the cost of increasing the query and update complexity by a logarithmic factor.

Table 2 compares with respect to various costs the authenticated distributed hash table (ADHT) with other existing authenticated storage schemes. The ADHT schemes realize an efficient technique that achieves signature amortization, where only one digital signature is used for a large collection of data items, thus, unlike the "sign-all" techniques, it is secure against replay attacks, at the slight overhead of increasing the time complexity and storage needs by a logarithmic factor. One can see that the authentication scheme that uses caching may be as efficient as other existing schemes and can achieve more scalability: for authenticating m data items, the signing cost is O(1) rather than O(m). Some other differences between the ADHT scheme and existing schemes that use the "Self-certified data" authentication technique [20] are: the self-certified technique is designed and developed for file systems, which tend to be flat, not balanced, structures and they authenticate static data. The ADHT technique is designed to authenticate many types of data elements, including high-volume data, collections of files or relatively small pieces of information, and can be fully dynamic.

An immediate application of the ADHT is a distributed authenticated dictionary. That is, membership queries are authenticated about the set of data items of a source. Assume that keys are drawn from a totally ordered space. The DMT tree is built on top of key-values paired in a sorted sequence according to their keys and it is appropriately extended to also serve as a search tree (with top-down traversal). Additionally, to support authentication of negative answers, the source can insert in the system pairs of key-value pairs such that the keys are consecutive in the ordering used in the Merkle tree. The distributed authenticated dictionary has asymptotically the same performance as the ADHT described above. Note that the distributed tree can be used in other (not necessarily security-related) applications.

Although the presented authentication structure achieves load balance with respect to data distribution over the p2p network (this is supported by the properties of the underlying DHT), as described, it may not achieve load balance with respect to network access. For instance, network nodes that store the tree root are generally accessed much more often than other network nodes. This may turn out to be an important issue: existing techniques for achieving authentication over DHTs that use signature amortization, including the presented technique or techniques based on self-certified data, introduce congestion at certain network nodes. The problem is challenging, since load-balancing and efficient content authentication in p2p systems correspond to contra-

TABLE 2

| | Storage | Signing Cost | Query Cost | Update Cost | Replay Attacks |
|---|---|---|---|---|---|
| Existing "sign-all" Schemes | O(m) | O(m) | O(log n) * | O(log n) * | Vulnerable |
| ADHT | O(m log m) | O(1) | O(log n log m) * | O(log n log m) ** | Secure |
| ADHT w/ Caching | O(m log m) | O(1) | O(log n + log m) * | O(log n + log m) ** | Secure |

Table 2 presents a comparison of the authenticated distributed hash table (ADHT) with other schemes that use no signature amortization. Here, n is the number of network nodes and m≦n is the size of data items stored. If caching is used and under reasonable assumptions about low rates for network node failures, the query and update costs of the ADHT scheme are improved by a logarithmic factor. Expected complexity is denoted using * and amortized expected complexity using **.

dictory design goals: signature amortization introduces heavily accessed points in the system, whereas for load-balancing it is desirable that network nodes be accessed with uniform, rather than skewed, distribution.

However, the following simple solution for load-balance in an amortized sense is proposed: after an update in the structure, choose new tree node ids for nodes in the corresponding verification path. New ids are chosen according to a random but specified way, such that significant communication overhead is not introduced in the structure. Effectively, over time, it is expected to achieve smoother (closer to uniform) access patterns for network nodes.

Figure 5:
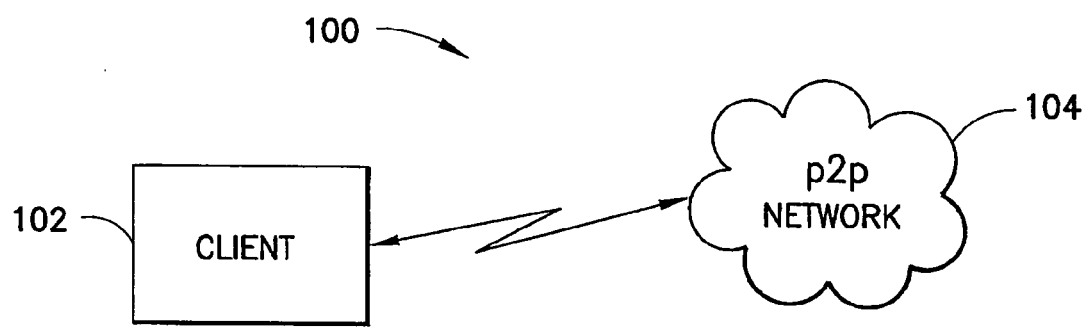
FIG. 5 shows a system in which the exemplary embodiments of the invention may be employed.

Referring to FIG. 5, a system 100 is shown in which the exemplary embodiments of the invention may be employed. The system 100 includes a client 102 communicating with a p2p network 104. The client 102 comprises an electronic device capable of communication with the p2p network 104. As a non-limiting example, the client 102 may comprise at least one data processor, at least one memory, a transceiver, and a user interface comprising a user input and a display device. The client 102 and/or p2p network 104 includes one or more components capable of implementing the exemplary embodiments of the invention. As a non-limiting example, an encryption component may be employed. As further non-limiting examples, the encryption component may be a separate entity (e.g. an integrated circuit, an Application Specific Integrated Circuit or ASIC) or may be integrated with other components (e.g. a program run by a data processor, functionality enabled by a data processor).

Figure 6:
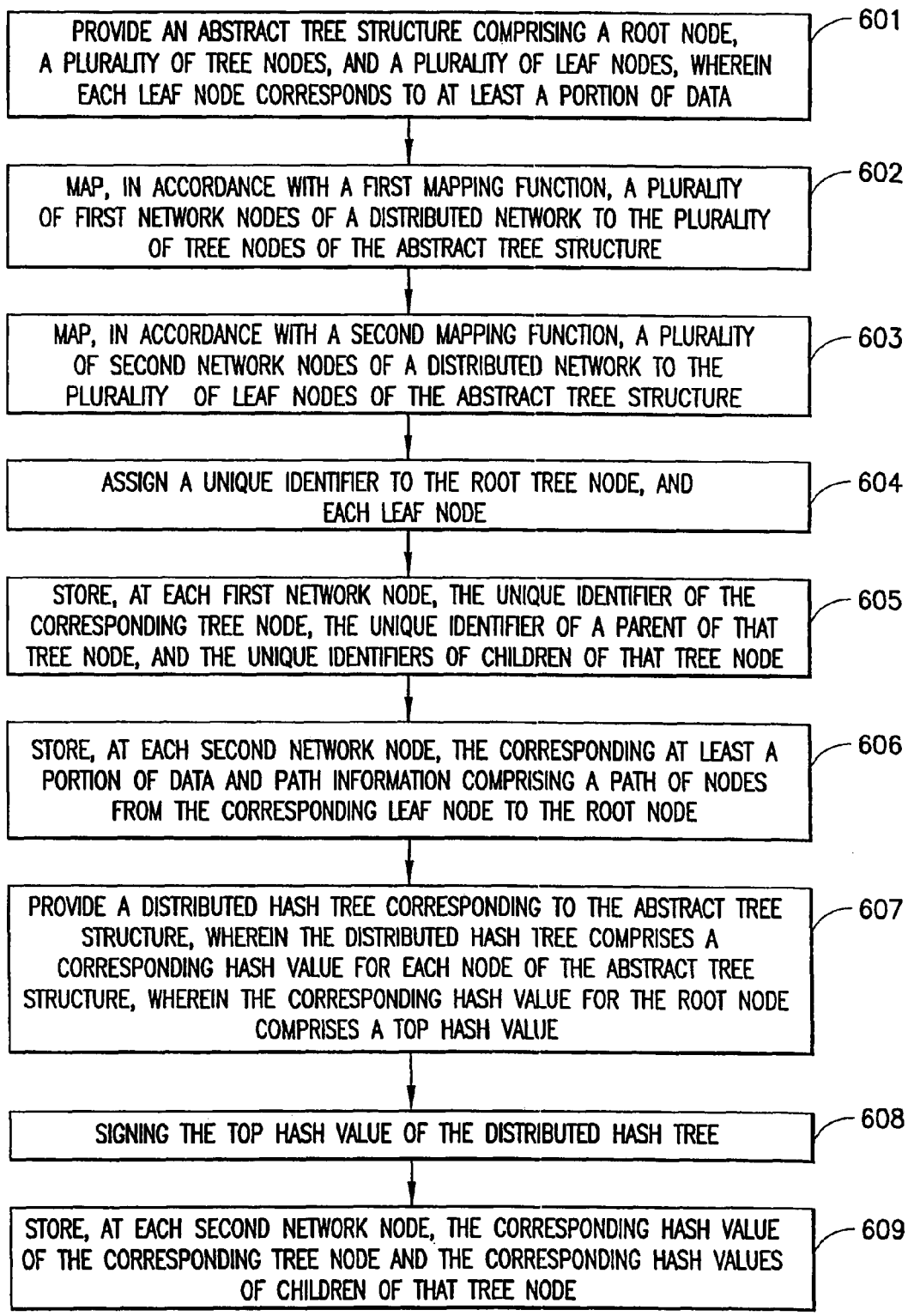
FIG. 6 depicts a flowchart illustrating one non-limiting example of a method for practicing the exemplary embodiments of this invention.

In one non-limiting, exemplary embodiment, and as shown in FIG. 6, a method comprises: providing an abstract tree structure comprising a root node, a plurality of tree nodes, and a plurality of leaf nodes, wherein each leaf node corresponds to at least a portion of data (box 601); mapping, in accordance with a first mapping function, a plurality of first network nodes of a distributed network to the plurality of tree nodes of the abstract tree structure (box 602); mapping, in accordance with a second mapping function, a plurality of second network nodes of the distributed network to the plurality of leaf nodes of the abstract tree structure (box 603); assigning a unique identifier to the root node, each tree node, and each leaf node (box 604); storing, at each first network node, the unique identifier of the corresponding tree node, the unique identifier of a parent of that tree node, and the unique identifiers of children of that tree node (box 605); storing, at each second network node, the corresponding at least a portion of data and path information comprising a path of nodes from the corresponding leaf node to the root node (box 606); providing a distributed hash tree corresponding to the abstract tree structure, wherein the distributed hash tree comprises a corresponding hash value for each node of the abstract tree structure, wherein the corresponding hash value for the root node comprises a top hash value (box 607); signing the top hash value of the distributed hash tree (box 608); and storing, at each second network node, the corresponding hash value of the corresponding tree node, and the corresponding hash values of children of that tree node (box 609).

In other embodiments, the top hash value is signed by the source of the data or by a trusted entity, as non-limiting examples. In contrast to other conventional schemes, in further embodiments, the top hash value may be the only piece of information that the data source signs. A signed top hash value (e.g., hash root or root hash) then may be stored at any network node, trusted or untrusted. For example, if a malicious node tried to modify the root hash value, the verification algorithm would detect the error and reject any incorrect (e.g., modified) data. As non-limiting examples, the root hash may be authenticated by using digital signatures or the root hash may be stored at a trusted network node if one exists.

Other embodiments of the method may comprise additional aspects or features of the exemplary embodiments of the invention as further described herein. As a non-limiting example, the above-presented method may comprise program instructions embodied on a tangible storage medium (e.g., a computer-readable medium), execution of the program instructions resulting in operations comprising the steps of the method and/or aspects of utilizing the exemplary embodiments of the invention.

5 Analysis of the Performance of the DMT

The scheme correctness is now discussed, i.e., it is shown that the above scheme implements a distributed Merkle tree. It is described how the tree is efficiently accessed, how it is maintainable after updates and also the associated computational, communication and storage costs. First, regarding the storage efficiency, one can easily see that the scheme requires O(m log m) storage. Indeed, internal tree nodes are stored in the network each using O(1) information and m leaf nodes are represented each using O(log in) information, since T is balanced. Now, assume that a tree T built over $X=\{x_1, \ldots, x_n\}$ is distributed over a network N and consider the task of accessing or locating the verification hash path corresponding to data item $x_i \in X$ and path $p_i$, initiated by network node M. Node M first locates the network node $W_i$ that stores $x_i$ (through mapping $g(\cdot)$), then $W_i$ reports to M (through a direct connection) the ids of the tree nodes in the corresponding path $p_i$ of T. Then M can locate the O(log in) network nodes storing hashing information related to the verification path of $x_i$; the mapping $f(\cdot)$ have to be used first to map tree ids to network nodes. After contacting O(log m) nodes; node M has retrieved all the verification information. Note that once a network node is located and contacted, not only the corresponding hash value of the tree node is retrieved but also the hash values of the children nodes. Thus, overall, retrieving the verification hashing path of an item takes O(log n log m) cost. In particular, it involves O(log m) location operations and O(log m) communication cost (through direct network connections).

Next, consider the problem of maintaining the tree balanced after an update in the hash tree. The simplest update corresponds to simply changing an object $x_i$ to a new object $x'_i$, where $g(x_i)=g(x'_i)$, that is when the storage location of $x_i$ does not change. This is not an extreme special case, but rather a typical one that may often occur when, for instance, data objects are actually key-value pairs and only the value is being updated. These updates are called hash updates, since only the hash values are updated. It is easy to see that only O(log m) hash values need to recomputed, whereas the structure of the tree stays the same. This can be done by node $N=g(x_i)$ (or any other node that initiates the update, locates N and contacts N) locating and contacting the network node U corresponding to the lowest in T node u in $p_i$ and notifying it about the change; then through O(log m) node locations and contacts every node in $p_i$ updates the hash value it stores and notifies the network node stoning its parent in T about the update. Thus, the update cost for this particular type of update is O(log n log m), since locating a network node takes O(log n) communication cost. Now consider the general case of an update, that is, an operation of the type insert(•) or delete(•) on the tree T. (Note that a replace(•) operation when $g(x_i) \neq g(x'_i)$ corresponds to a series of two such operations.) Then, not only O(log m) hash values are to be updated, but also the tree T may need a structural update, due to re-balancing operations. The distributed update process is as follows. Network node $W_i$ responsible for the update on data item $x_i$ gradually performs the update and in a bottom-up fashion, according to its corresponding path $p_i$. That is, a leaf node is deleted or created and the path is checked using a bottom-up traversal of it, for any restructuring operations (i.e., rotations). Note that all necessary information may be available at node $W_i$ for this check (the balancing information of $p_i$ is stored at $W_i$). Node $W_i$ traverses path $p_i$ and if no rotation is needed while examining tree node u, then the network node $U=f(v)$ corresponding to u is contacted (after it is first located) so that its hash value is recomputed. If additionally a rotation is needed at node u, then node U is notified appropriately by $W_i$ and $f(v)$ executes the rotation by contacting (after first locating) the appropriate nodes among its neighboring in T network nodes. Node $W_i$ is notified about the structural change, i.e., it learns the ids and the balancing information of the new nodes in $p'_i$. (Alternatively, once the rotation is complete, node $W_i$ updates the balancing information of the affected by the rotation nodes by contacting them.) Then node $W_i$ goes on to the node higher in $p_i$. Thus, the new path $p'_i$ can be computed completely after O(log m) location operations and O(log m) communications between network nodes, that is, the cost for updating the verification path $p_i$ to the new path $p'_i$ is O(log n log m). However, since verification paths are distributed over the network N and if path $p_i$ structurally changed to $p'_i$ then it should be advertised to the network nodes which leaf nodes in T that belong in subtrees affected by the rotations are mapped to through $g(\cdot)$. This cost is referred to as structural update cost. Note that for general trees T the structural update cost can be of order O(m log m), involving O(m) network node locations: indeed, a rotation at level k of T requires $O(2^k)$ location operations, proportional to the size of the affected subtree of T. This is because, the change due to a rotation must be distributed to the appropriate nodes of network in a top-down fashion by a series of node locations and communications. However, recall that the scheme uses a weight-balanced BB[α] tree as T, where the weight of a tree node is the number of leaves in the subtree defined by this node and α is a balance parameter. This choice is justified by the explanation above. Over a linear number of update operations, the scheme generally uses a logarithmic number of node locations.

6. Conclusions

Herein the problem of data authentication and data integrity in peer-to-peer distributed storage networks is considered. The model of authenticated data structures is extended to capture the security needs of these types of systems with respect to data authentication. An efficient implementation of a distributed Merkle tree (DMT) is designed for peer-to-peer systems. Inefficiencies and security problems in the authentication techniques currently used by peer-to-peer distributed storage systems are identified and it is shown how the DMT can be used in combination with a distributed hash table (DHT) to implement an efficient authenticated DHT (ADHT). Using an ADHT, an efficient distributed authenticated dictionary is presented.

The DMT will be implemented to further experimentally test its efficiency. It is left as open problems the design of authenticated distributed data structures for more general queries and additional security issues in this model, such as DOS attacks and Byzantine behavior. Also, another related issue is load-balancing. Existing techniques for achieving authentication over DHTs that use signature amortization, including the above technique or techniques based on self-certified data, introduce congestion at certain network nodes. The problem seems to be particularly challenging, since load-balancing and efficient content authentication in p2p systems correspond to contradictory design goals: signature amortization introduces heavily accessed points in the system, whereas for load-balancing it is desirable that network nodes be accessed with uniform, rather than skewed, distribution.

Generally, various exemplary embodiments of the invention can be implemented in different mediums, such as software, hardware, logic, special purpose circuits or any combination thereof. As a non-limiting example, some aspects may be implemented in software which may be run on a computing device, while other aspects may be implemented in hardware.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of features of the preferred embodiments of this invention could be used to advantage without the corresponding use of other features. As such, the foregoing description should be considered as merely illustrative of the principles of the invention, and not in limitation thereof.

LIST OF REFERENCES

[1] A. Anagnostopoulos, M. T. Goodrich, and R. Tamassia. Persistent authenticated dictionaries and their applications. In *Proc. Information Security Conference (ISC* 2001), volume 2200 of *LNCS*, pages 379-393. Springer-Verlag, 2001.

[2] L. Arge, D. Eppstein, and M. T. Goodrich. Skip-webs: Efficient distributed data structures for multidimensional data sets. In 24*th ACM Symp. on Principles of Distributed Computing (PODC)*, 2005.

[3] J. Aspnes and G. Shah. Skip graphs. In *Proc. ACM-SIAM Symposium on Discrete Algorithms*, pages 384-393, 2003.

[4] E. Bertino, B. Carminati, E. Ferrari, B. M. Thuraisingham, and A. Gupta. Selective and authentic third-party distribution of XML documents. *IEEE Transactions on Knowledge and Data Engineering*, 16(6):1263-1278, 2004.

[5] A. Buldas, P. Laud, and H. Lipmaa. Accountable certificate management using undeniable attestations. In *ACM Conference on Computer and Communications Security*, pages 9-18. ACM Press, 2000.

[6] C. Cachin. Distributing trust on the Internet. In *Conference on dependable systems and networks (DSN-*2001), Gothenborg, Sweden, 2001.

[7] C. Cachin and A. Samar. Secure distributed dns. In *International Conference on Dependable Systems and Networks (DSN'*04), page 423, Gothenborg, Sweden, 2004.

[8] C. Cachin and S. Tessaro. Asynchronous verifiable information dispersal. In *DISC*, pages 503-504, 2005.

[9] C. Cachin and S. Tessaro. Optimal resilience for erasure-coded byzantine distributed storage. In *DISC*, pages 497-498, 2005.

[10] J. Camenisch and A. Lysyanskaya. Dynamic accumulators and application to efficient revocation of anonymous credentials. In *Proc. CRYPTO,* 2002.

[11] M. Castro, P. Drushel, A. Ganesh, A. Rowstron, and D. Wallach. Secure routing for structured peer-to-peer overlay networks. In *In Proceedings of Usenix Symposium of Operating Systems Design and Implementation (OSDI)*, 2002.

[12] A. Crainiceanu, P. Ling a, J. Gehrke, and J. Shanmugasundaram. Querying peer-to-peer networks using P-trees, 2004.

[13] F. Dabek, M. F. Kaashoek, D. Karger, R. Morris, and I. Stoica. Wide-area cooperative storage with CFS. In *Proceedings of the* 18*th ACM Symposium on Operating Systems Principles (SOSP '*01), Chateau Lake Louise, Banff, Canada, October 2001.

[14] P. Devanbu, M. Gertz, A. Kwong, C. Martel, G. Nuckolls, and S. Stubblebine. Flexible authentication of XML documents. In *Proc. ACM Conference on Computer and Communications Security*, pages 136-145, 2001.

[15] P. Devanbu, M. Gertz, C. Martel, and S. G. Stubblebine. Authentic data publication over the Internet. *Journal of Computer Security*, 11(3): 291-314, 2003.

[16] P. Druschel and A. Rowstron. Past: A large-scale, persistent peer-to-peer storage utility. In *HOTOS '01: Proceedings of the Eighth Workshop on Hot Topics in Operating Systems*, page 75, Washington, D.C., USA, 2001. IEEE Computer Society.

[17] A. Fiat and J. Saia. Censorship resistant peer-to-peer content addressable networks. In *Proceedings of Symposium on Discrete Algorithms*, 2002.

[18] A. Fiat, J. Saia, and M. Young. Making chord robust to byzantine attacks. In *ESA*, pages 803-814, 2005.

[19] M. J. Freedman and R. Vingralek. Efficient peer-to-peer lookup based on a distributed trie. In *Proceedings of the 1st International Workshop on Peer-to-Peer Systems (IPTPS02)*, Cambridge, Mass., March 2002.

[20] K. Fu, M. F. Kaashoek, and D. Mazieres. Fast and secure distributed read-only file system. *Computer Systems*, 20(1):1-24, 2002.

[21] P. Ganesan and G. S. Manku. Optimal routing in Chord. In *15th ACM-SIAM Symp. on Discrete Algorithms (SODA)*, pages 169-178, 2004.

[22] I. Gassko, P. S. Gemmell, and P. MacKenzie. Efficient and fresh certification. In *Int. Workshop on Practice and Theory in Public Key Cryptography (PKC '2000)*, volume 1751 of *LNCS*, pages 342-353. Springer-Verlag, 2000.

[23] M. T. Goodrich, M. J. Nelson, and J. Z. Sun. The rainbow skip graph: a fault-tolerant constant-degree distributed data structure. In *SODA '06: Proceedings of the seventeenth annual ACM-SIAM symposium on Discrete algorithm*, pages 384-393, New York, N.Y., USA, 2006. ACM Press.

[24] M. T. Goodrich, M. Shin, R. Tamassia, and W. H. Winsborough. Authenticated dictionaries for fresh attribute credentials. In *Proc. Trust Management Conference*, volume 2692 of *LNCS*, pages 332-347. Springer, 2003.

[25] M. T. Goodrich and R. Tamassia. Efficient authenticated dictionaries with skip lists and commutative hashing. Technical report, Johns Hopkins Information Security Institute, 2000.

[26] M. T. Goodrich, R. Tamassia, and J. Hasic. An efficient dynamic and distributed cryptographic accumulator. In *Proc. of Information Security Conference (ISC)*, volume 2433 of *LNCS*, pages 372-388. Springer-Verlag, 2002.

[27] M. T. Goodrich, R. Tamassia, and A. Schwerin. Implementation of an authenticated dictionary with skip lists and commutative hashing. In *Proc. 2001 DARPA Information Survivability Conference and Exposition*, volume 2, pages 68-82, 2001.

[28] M. T. Goodrich, R. Tamassia, N. Triandopoulos, and R. Cohen. Authenticated data structures for graph and geometric searching. In *Proc. RSA Conference—Cryptographers' Track*, volume 2612 of *LNCS*, pages 295-313. Springer, 2003.

[29] E. Hall and C. S. Julta. Parallelizable authentication trees. In Cryptology ePrint Archive, December 2002.

[30] N. J. A. Harvey, M. B. Jones, S. Saroiu, M. Theimer, and A. Wolman. SkipNet: A scalable overlay network with practical locality properties. In *USENIX Symp. on Internet Technologies and Systems*, Lecture Notes in Computer Science, 2003.

[31] H. V. Jagadish, B. C. Ooi, and Q. H. Vu. Baton: a balanced tree structure for peer-to-peer networks. In *VLDB '05: Proceedings of the 31st international conference on Very large data bases*, pages 661-672. VLDB Endowment, 2005.

[32] M. Jakobsson, T. Leighton, S. Micali, and M. Szydlo. Fractal merkle tree representation and traversal. In *Proc. RSA Conference—Cryptographers' Track*, volume 2612 of *LNCS*, pages 3.14-326. Springer, 2003.

[33] T. Johnson and P. Krishna. Lazy updates for distributed search structure. In *SIGMOD '93: Proceedings of the 1993 ACM SIGMOD international conference on Management of data*, pages 337-346, New York, N.Y., USA, 1993. ACM Press.

[34] F. Kaashoek and D. R. Karger. Koorde: A simple degree-optimal distributed hash table. In *2nd Int. Workshop on Peer-to-Peer Systems*, 2003.

[35] D. Karger; E. Lehman, T. Leighton, M. Levine, D. Lewin, and R. Panigrahy. Consistent hashing and random trees: Distributed caching protocols for relieving hot spots on the World Wide Web. In *Proceedings of the Twenty-Ninth Annual ACM Symposium on Theory of Computing*, pages 654-663, 1997.

[36] P. C. Kocher. On certificate revocation and validation. In *Proc. Int. Conf. on Financial Cryptography*, volume 1465 of *LNCS*. Springer-Verlag, 1998.

[37] K. Kothapalli and C. Scheideler. Supervised peer-to-peer systems. In *Proc. of 2005 International Symposium on Parallel Architectures, Algorithms, and Networks (I-SPAN)*, 2005.

[38] M. Krohn, M. Freedman, and D. Mazieres. On-the-fly verification of rateless erasure codes for efficient content distribution. In *Proceedings of IEEE Symposium on Security and Privacy*, pages 226-240, May 2004.

[39] B. Kroll and P. Widmayer. Distributing a search tree among a growing number of processors. In *Proceedings of the ACM SIGMOD International Conference on Management of Data (SIGMOD94)*, pages 265-276, 1994.

[40] J. Li, K. Sollins, and D.-Y. Lim. Implementing aggregation and broadcast over distributed hash tables. *SIGCOMM Comput. Commun. Rev.*, 35(1):81-92, 2005.

[41] A. Lysyanskaya, R. Tamassia, and N. Triandopoulos. Multicast authentication in fully adversarial networks. In *Proceedings of IEEE Symposium on Security and Privacy*, pages 241-255, May 2004.

[42] P. Maniatis and M. Baker. Enabling the archival storage of signed documents. In *Proc. USENIX Conf. on File and Storage Technologies (FAST 2002)*, Monterey, Calif., USA, 2002.

[43] P. Maniatis and M. Baker. Secure history preservation through timeline entanglement. In *Proc. USENIX Security Symposium*, 2002.

[44] G. S. Manku, M. Bawa, and P. Raghavan. Symphony: Distributed hashing in a small world. In *4th USENIX Symp. on Internet Technologies and Systems*, 2003.

[45] G. S. Manku, M. Naor, and U. Wieder. Know thy neighbor's neighbor: the power of look ahead in randomized P2P networks. In *Proceedings of the 36th ACM Symposium on Theory of Computing (STOC)*, pages 54-63, 2004.

[46] C. Martel, G. Nuckolls, P. Devanbu, M. Gertz, A. Kwong, and S. G. Stubblebine. A general model for authenticated data structures. *Algorithmica*, 39(1):21 41, 2004.

[47] R. C. Merkle. Protocols for public key cryptosystems. In *IEEE Symposium on Security and Privacy*, pages 122-134, 1980.

[48] R. C. Merkle. A certified digital signature. In G. Brassard, editor, *Proc. CRYPTO '89*, volume 435 of *LNCS*, pages 218-238. Springer-Verlag, 1989.

[49] R. Morselli, S. Bhattacharjee, J. Katz, and P. Keleher. Trust-preserving set operations. In *23rd Conference of the IEEE Communications Society (Infocom)*, March 2004.

[50] E. Mykletun, M. Narasimha, and G. Tsudik. Authentication and integrity in outsourced databases. In *Proceeding of Network and Distributed System Security (NDSS)*, 2004.

[51] M. Naor and K. Nissim. Certificate revocation and certificate update. In *Proc. 7th USENIX Security Symposium*, pages 217-228, Berkeley, 1998.

[52] M. Naor and U. Wieder. Novel architectures for p2p applications: the continuous-discrete approach, 2002.

[53] M. Naor and U. Wieder. Know thy neighbor's neighbor: Better routing in skip-graphs and small worlds. In *3rd Int. Workshop on Peer-to-Peer Systems*, 2004.

[54] G. Nuckolls. Verified query results from hybrid authentication trees. In *DESec05*, 2005.

[55] G. Nuckolls, C. Martel, and S. Stubblebine. Certifying data from multiple sources [extended abstract]. In *Proceedings of the 4th ACM conference on Electronic commerce*, pages 210-211, New York, N.Y., USA, 2003. ACM Press.

[56] C. Plaxton, R. Rajaraman, and A. W. Richa. Accessing nearby copies of replicated objects in a distributed environment. In *Proceedings of ACM SPAA*, June 1997.

[57] W. Pugh. Skip lists: a probabilistic alternative to balanced trees. *Commun. ACM*, 33(6):668-676, 1990.

[58] S. Ramabhadran, J. Hellerstein, S. Ratnasamy, and S. Shenker: Prefix hash tree—an indexing data structure over distributed hash tables, 2004.

[59] S. Ratnasamy, P. Francis, M. Handley, R. Karp, and S. Shenker. A scalable content-addressable network. In *Proceedings of SIGCOMM '01*, pages 161-172, San Diego, Calif., August 2001.

[60] S. Ratnasamy, P. Francis, M. Handley, R. M. Karp, and S. Shenker. A scalable content-addressable network. In *SIGCOMM*, pages 161-172, 2001.

[61] S. Rhea, B. Godfrey, B. Karp, J. Kubiatowicz, S. Ratnaamy, S. Shenker, I. Stoica, and H. Yu. OpenDHT: A public DHT service and its uses. In *Proceedings of the 2005 ACM SIGCOMM Conference*, 2005.

[62] A. Rowstron and P. Druschel. Pastry: Scalable, decentralized object location, and routing for largescale peer-to-peer systems. *Lecture Notes in Computer Science*, 2218:329-??, 2001.

[63] A. I. T. Rowstron, A.-M. Kermarrec, M. Castro, and P. Druschel. SCRIBE: The design of a large-scale event notification infrastructure. In *Networked Group Communication*, pages 30-43, 2001.

[64] J. Saia, A. Fiat, S. Gribble, A. Karlin, and S. Saroiu. Dynamically fault-tolerant content addressable networks, 2002.

[65] E. Shi, A. Perrig, and L. V. Doom. Bind: A fine-grained attestation service for secure distributed systems. In *Proceedings of the 2005 IEEE Symposium on Security and Privacy*, pages 154-168, Washington, D.C., USA, 2005. IEEE Computer Society.

[66] E. Sit and R. Morris. Security considerations for peer-to-peer distributed hash tables, 2002.

[67] I. Stoica, R. Morris, D. Karger, F. Kaashoek, and H. Balakrishnan. Chord: A scalable Peer-To-Peer lookup service for internet applications. In *Proceedings of the 2001 ACM SIGCOMM Conference*, pages 149-160, 2001.

[68] I. Stoics, R. Morris, D. Karger, F. Kaashoek, and H. Balakrishnan. Chord: A scalable Peer-To-Peer lookup service for internet applications. In *Proceedings of the 2001 ACM SIGCOMM Conference*, pages 149-160, 2001.

[69] R. Tamassia and N. Triandopoulos. Computational bounds on hierarchical data processing with applications to information security. In *Proc. Int. Colloquium on Automata, Languages and Programming (ICALP)*, volume 3580 of *LNCS*, pages 153-165. Springer-Verlag, 2005.

[70] Y. Xie, D. O'Hallaron, and M. K. Reiter. A secure distributed search system. In *Proceedings of the 11th IEEE Int. Symp. on High Performance Distributed Computing (HPDC)*, pages 321-332, 2002.

[71] C. Zhang, A. Krishnamurthy, and R. Wang. Brushwood: Distributed trees in peer-to-peer systems. In *Proceedings of the 4th International Workshop on Peer-to-Peer Systems (IPTPS05)*, 2005.

[72] B. Y. Zhao, J. D. Kubiatowicz, and A. D. Joseph. Tapestry: An infrastructure for fault-tolerant widearea location and routing. Technical Report UCB/CSD-01-1141, UC Berkeley, April 2001.

What is claimed is:

1. A method comprising:
providing an abstract tree structure comprising a plurality of tree nodes disposed between a root node and a plurality of leaf nodes, wherein each leaf node corresponds to at least a portion of data;
mapping, in accordance with a first mapping function, a plurality of first network nodes of a distributed network to the plurality of tree nodes of the abstract tree structure;
mapping, in accordance with a second mapping function, a plurality of second network nodes of the distributed network to the plurality of leaf nodes of the abstract tree structure;
assigning different unique identifiers to the root node, each tree node, and each leaf node;
storing, at each first network node, the unique identifier of the corresponding tree node, the unique identifier of a parent of that tree node, and the unique identifiers of children of that tree node;
storing, at each second network node, the at least a portion of data for the corresponding leaf node and path information comprising a path of nodes in the abstract tree structure from the corresponding leaf node to the root node;
providing a distributed hash tree corresponding to the abstract tree structure, wherein the distributed hash tree comprises a corresponding hash value for each node of the abstract tree structure, wherein the corresponding hash value for the root node comprises a top hash value;
signing the top hash value of the distributed hash tree; and
storing, at each first network node, the corresponding hash value of the corresponding tree node and the corresponding hash values of children of that tree node.

2. The method of claim 1, further comprising:
receiving a query at the distributed network; and
in response to receiving the query, the distributed network replying with an answer to the query and a proof of the validity of the answer, wherein the proof comprises a proof hash value.

3. The method of claim 2, further comprising:
authenticating the answer by comparing the proof hash value with at least a portion of the top hash value.

4. The method of claim 1, wherein the first mapping function comprises the second mapping function.

5. The method of claim 1, wherein the path information comprises the unique identifiers of the tree nodes in the path and structural and balancing information of the tree nodes in the path.

6. The method of claim 1, further comprising:
storing, at each first network node, local structural information.

7. The method of claim 1, wherein the abstract tree structure comprises at least one of a binary tree, a weight-balanced tree and a BB[α] tree.

8. The method of claim 1, further comprising:
utilizing the abstract tree structure as a search tree.

9. The method of claim 1, further comprising:
utilizing the abstract tree structure as a distributed authenticated dictionary.

10. The method of claim 1, further comprising:
caching, at each second network node, the unique identifiers of the tree nodes in the path of that second network node.

11. The method of claim 1, further comprising:
updating or modifying the at least a portion of data stored by at least one second network node.

12. The method of claim 11, further comprising:
assigning new unique identifiers to the nodes of the path of the at least one second network node.

13. The method of claim 11, wherein the updating or modifying is performed by a source external to the distributed network.

14. The method of claim 1, executed by a computer program product embodied on a non transitory tangible storage medium.

15. A distributed network comprising:
a plurality of first network nodes mapped, in accordance with a first mapping function, to a plurality of tree nodes of an abstract tree structure, wherein the abstract tree structure comprises the plurality of tree nodes disposed between a root node and a plurality of leaf nodes, wherein each leaf node corresponds to at least a portion of data; and
a plurality of second network nodes mapped, in accordance with a second mapping function, to the plurality of leaf nodes of the abstract tree structure,
wherein the root node, each tree node, and each leaf node of the abstract tree structure is assigned a different unique identifier,
wherein each first network node stores the unique identifier of the corresponding tree node, the unique identifier of a parent of that tree node, and the unique identifiers of children of that tree node,
wherein each second network node stores the at least a portion of data for the corresponding leaf node and path information comprising a path of nodes in the abstract tree structure from the corresponding leaf node to the root node,
wherein, in accordance with a distributed hash tree corresponding to the abstract tree structure, each node of the abstract tree structure comprises a corresponding hash value,
wherein the corresponding hash value for the root node comprises a top hash value,
wherein the top hash value is signed by a trusted entity to obtain a signed top hash value,
wherein the signed top hash value is stored by a node of the distributed network,
wherein each first network node stores the corresponding hash value of the corresponding tree node and the corresponding hash values of children of that tree node.

16. The distributed network of claim 15, wherein the abstract tree structure is configured to be used as a search tree.

17. The distributed network of claim 15, wherein the abstract tree structure is configured to be used as a distributed authenticated dictionary.

18. The distributed network of claim 15, wherein the distributed network is configured to update or modify the at least a portion of data stored by at least one second network node.

19. The distributed network of claim 18, wherein the distributed network is further configured, in response to the at least a portion of data stored by the at least one second network node being updated or modified, to assign new unique identifiers to the nodes of the path of the at least one second network node.

20. The distributed network of claim 15, wherein the distributed network is configured, in response to receiving a query, to reply with an answer to the query and a proof of the validity of the answer.

* * * * *